United States Patent
Kontomaris et al.

(10) Patent No.: US 10,435,604 B2
(45) Date of Patent: Oct. 8, 2019

(54) USE OF (2E)-1,1,1,4,5,5,5-HEPTAFLUORO-4-(TRIFLUOROMETHYL)PENT-2-ENE IN POWER CYCLES

(71) Applicant: THE CHEMOURS COMPANY FC, LLC, Wilmington, DE (US)

(72) Inventors: Konstantinos Kontomaris, Wilmington, DE (US); Robert Daniel Lousenberg, Wilmington, DE (US)

(73) Assignee: THE CHEMOURS COMPANY FC, LLC, Wilmington, DE (US)

( * ) Notice: Subject to any disclaimer, the term of this patent is extended or adjusted under 35 U.S.C. 154(b) by 0 days.

(21) Appl. No.: 15/517,866

(22) PCT Filed: Oct. 9, 2015

(86) PCT No.: PCT/US2015/054874
§ 371 (c)(1),
(2) Date: Apr. 7, 2017

(87) PCT Pub. No.: WO2016/069242
PCT Pub. Date: May 6, 2016

(65) Prior Publication Data
US 2017/0306205 A1 Oct. 26, 2017

Related U.S. Application Data

(60) Provisional application No. 62/072,662, filed on Oct. 30, 2014.

(51) Int. Cl.
C09K 5/04 (2006.01)
F01K 7/32 (2006.01)
F01K 25/00 (2006.01)
F25B 21/02 (2006.01)

(52) U.S. Cl.
CPC ............... C09K 5/045 (2013.01); C09K 5/04 (2013.01); F01K 7/32 (2013.01); F01K 25/00 (2013.01); F25B 21/02 (2013.01); C09K 2205/126 (2013.01); Y02E 10/46 (2013.01)

(58) Field of Classification Search
CPC .... C09K 5/045; C09K 5/04; C09K 2205/126; F25B 21/02; F01K 25/00; F01K 7/32
USPC ........ 252/67, 68, 69; 62/597; 60/641.1, 516, 60/643
See application file for complete search history.

(56) References Cited

U.S. PATENT DOCUMENTS

| | | | |
|---|---|---|---|
| 4,142,108 A | 2/1979 | Matthews | |
| 7,959,828 B2 * | 6/2011 | Nappa | C03C 23/0075 134/1.3 |
| 2006/0010872 A1 * | 1/2006 | Singh | C09K 5/045 60/671 |
| 2006/0242985 A1 * | 11/2006 | Leck | B60H 1/3223 62/323.1 |
| 2007/0108403 A1 | 5/2007 | Sievert et al. | |
| 2010/0154419 A1 | 6/2010 | Kontomaris | |
| 2010/0263380 A1 * | 10/2010 | Biederman | F01K 23/065 60/651 |
| 2012/0117991 A1 | 5/2012 | Rached | |
| 2013/0104548 A1 | 5/2013 | Kontomaris | |
| 2013/0160447 A1 | 6/2013 | Kontomaris | |
| 2014/0174084 A1 | 6/2014 | Kontomaris | |
| 2016/0178254 A1 * | 6/2016 | Nishiguchi | C09K 5/044 62/115 |
| 2017/0275514 A1 * | 9/2017 | Kontomaris | C09K 5/045 |

OTHER PUBLICATIONS

CAS No. 1894231-35-6, Apr. 20, 2016. (Year: 2016).*
PCT International Search Report and Written Opinion dated Feb. 16, 2016.
Tahir, Musthafah B. Mohd et al, Efficiency of Compact Organic Rankine Cycle System with Rotary-Vane-Type Expander for Low-Temperature Waste Heat Recovery, International Journal of Civil and Environmental Engineering, 2010, pp. 11-16.
Chen et al., A supercritical Rankine cycle using zeotropic mixture working fluids for the conversion of low-grade heat into power, Energy, 2011, pp. 549-555, vol. 36.
Davis et al., Geothermal power production from abandoned oil wells, Energy, 2009, pp. 866-872, vol. 34.
Brasz et al., Power Production from a Moderate-Temperature Geothermal Resource, GRC Annual Meeting, Sep. 25-28, 2005, Reno, Nevada.
International Preliminary Report on Patentability in International Application No. PCT/US2015/054874, dated May 2, 2017, 8 pages.
Japanese Office Action in Japanese Application No. 2017-523840, dated Jun. 14, 2019, 10 pages.

* cited by examiner

*Primary Examiner* — Douglas J McGinty

(57) ABSTRACT

A method is provided for converting heat from a heat source to mechanical energy. The method comprises heating a working fluid using heat supplied from the heat source; and expanding the heated working fluid to lower pressure of the working fluid and generating mechanical energy as the pressure of the working fluid is lowered. The method is characterized by using a working fluid comprising (2E)-1,1,1,4,5,5,5-heptafluoro-4-(trifluoromethyl)pent-2-ene (HFO-153-10mzzy). Also provided is a power cycle apparatus. The apparatus is characterized by containing a working fluid comprising HFO-153-10mzzy.

17 Claims, 2 Drawing Sheets

USE OF (2E)-1,1,1,4,5,5,5-HEPTAFLUORO-4-(TRIFLUOROMETHYL)PENT-2-ENE IN POWER CYCLES

RELATED APPLICATIONS

This application represents a national filing under 35 U.S.C. 371 of International Application No. PCT/US2015/054874 filed Oct. 9, 2015, and claims priority to U.S. Provisional Patent Application 62/072,662, filed on Oct. 30, 2014.

BACKGROUND

Low global warming potential working fluids are needed for power cycles such as organic Rankine cycles. Such materials must have low environmental impact, as measured by low global warming potential and low ozone depletion potential.

SUMMARY

The present invention involves compositions comprising (2E)-1,1,1,4,5,5,5-heptafluoro-4-(trifluoromethyl)pent-2-ene (hereinafter "HFO-153-10mzzy"). Embodiments of the present invention involve the compound HFO-153-10mzzy, either alone or in combination with one or more other compounds as described in detail herein below.

In accordance with this invention, a method is provided for converting heat from a heat source to mechanical energy. The method comprises heating a working fluid using heat supplied from the heat source; and expanding the heated working fluid to lower the pressure of the working fluid and generate mechanical energy as the pressure of the working fluid is lowered. The method is characterized by using a working fluid comprising HFO-153-10mzzy.

In accordance with this invention, a power cycle apparatus containing a working fluid to convert heat to mechanical energy is provided. The apparatus is characterized by containing a working fluid comprising HFO-153-10mzzy.

In accordance with this invention, a working fluid comprising HFO-153-10mzzy is provided.

DETAILED DESCRIPTION

Figure 1:
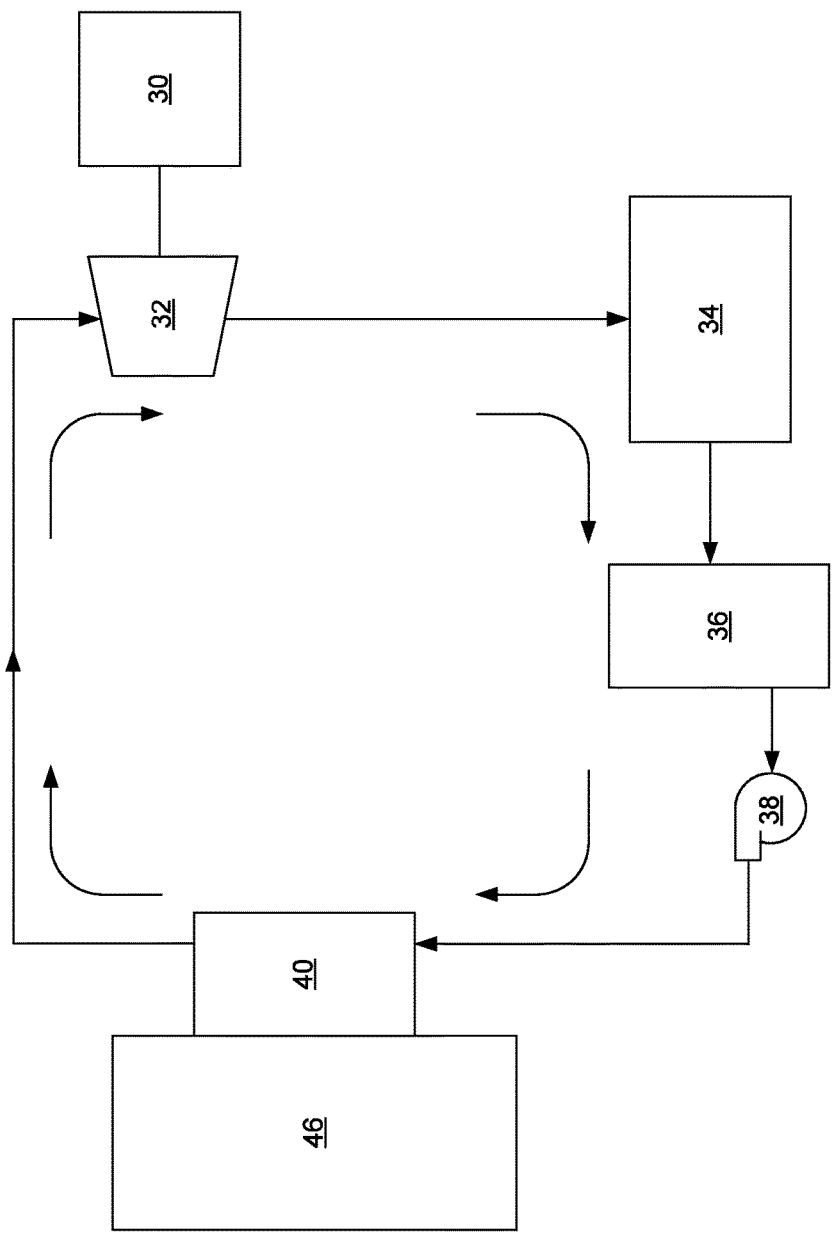
FIG. 1 is a block diagram of a heat source and a power cycle system (e.g. an organic Rankine cycle system) in direct heat exchange according to embodiments of the present invention.

Before addressing details of embodiments described below, some terms are defined or clarified.

Global warming potential (GWP) is an index for estimating relative global warming contribution due to atmospheric emission of a kilogram of a particular greenhouse gas compared to emission of a kilogram of carbon dioxide. GWP can be calculated for different time horizons showing the effect of atmospheric lifetime for a given gas. The GWP for the 100 year time horizon is commonly the value referenced.

Net cycle power output is the rate of mechanical work generation at an expander (e.g., a turbine) less the rate of mechanical work consumed by a compressor (e.g., a liquid pump).

Volumetric capacity for power generation is the net cycle power output per unit volume of working fluid (as measured at the conditions at the expander outlet) circulated through the power cycle (e.g., organic Rankine cycle).

Cycle efficiency (also referred to as thermal efficiency) is the net cycle power output divided by the rate at which heat is received by the working fluid during the heating stage of a power cycle (e.g., organic Rankine cycle).

Subcooling is the reduction of the temperature of a liquid below that liquid's saturation point for a given pressure. The saturation point is the temperature at which a vapor composition is completely condensed to a liquid (also referred to as the bubble point). But subcooling continues to cool the liquid to a lower temperature liquid at the given pressure. Subcool amount is the amount of cooling below the saturation temperature (in degrees) or how far below its saturation temperature a liquid composition is cooled.

Superheat is a term that defines how far above the saturation vapor temperature of a vapor composition a vapor composition is heated. Saturation vapor temperature is the temperature at which, if a vapor composition is cooled, the first drop of liquid is formed, also referred to as the "dew point".

As used herein, the terms "comprises," "comprising," "includes," "including," "has," "having" or any other variation thereof, are intended to cover a non-exclusive inclusion. For example, a composition, process, method, article, or apparatus that comprises a list of elements is not necessarily limited to only those elements but may include other elements not expressly listed or inherent to such composition, process, method, article, or apparatus.

The transitional phrase "consisting of" excludes any element, step, or ingredient not specified. If in the claim such would close the claim to the inclusion of materials other than those recited except for impurities ordinarily associated therewith. When the phrase "consists of" appears in a clause of the body of a claim, rather than immediately following the preamble, it limits only the element set forth in that clause; other elements are not excluded from the claim as a whole.

The transitional phrase "consisting essentially of" is used to define a composition, method or apparatus that includes materials, steps, features, components, or elements, in addition to those literally disclosed provided that these additional included materials, steps, features, components, or elements do not materially affect the basic and novel characteristic(s) of the claimed invention. The term "consisting essentially of" occupies a middle ground between "comprising" and "consisting of."

Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Unless otherwise defined, all technical and scientific terms used herein have the same meaning as commonly understood by one of ordinary skill in the art to which this invention belongs. Although methods and materials similar or equivalent to those described herein can be used in the practice or testing of embodiments of the present invention, suitable methods and materials are described below. All publications, patent applications, patents, and other references mentioned herein are incorporated by reference in their entirety, unless a particular passage is cited. In case of conflict, the present specification, including definitions, will control. In addition, the materials, methods, and examples are illustrative only and not intended to be limiting.

HFO-153-10mzzy, (2E)-1,1,1,4,5,5,5-heptafluoro-4-(trifluoromethyl)pent-2-ene, can be prepared by dehyroiodination of 1,1,1,2,5,5,5-heptafluoro-2-(trifluoromethyl)-4-iodopentane as disclosed in U.S. Patent Publication No. 8148584, incorporated herein by reference.

Power Cycle Methods

A sub-critical power cycle or organic Rankine cycle (ORC) is defined as a Rankine cycle in which an organic working fluid used in the cycle receives heat at a pressure lower than the critical pressure of the organic working fluid and the working fluid remains below its critical pressure throughout the entire cycle.

A trans-critical power cycle is defined as a power cycle similar to a Rankine cycle except that the organic working fluid used in the cycle receives heat at a pressure higher than the critical pressure of the organic working fluid. In a trans-critical cycle, the working fluid is not at a pressure higher than its critical pressure throughout the entire cycle.

A super-critical power cycle is defined as a power cycle which operates at pressures higher than the critical pressure of an organic working fluid used in the cycle and involves the following steps: compression; heating; expansion; cooling.

A method for converting heat from a heat source to mechanical energy is provided. The method comprises: heating a working fluid comprising HFO-153-10mzzy using heat supplied from the heat source; and expanding the heated working fluid to lower the pressure of the working fluid and generate mechanical energy as the pressure of the working fluid is lowered.

The method of this invention is typically used in a power cycle similar to an organic Rankine power cycle except that heat absorption by the working fluid could occur through evaporation (i.e. as in the classical Rankine cycle) or through sensible heating of the working fluid at a pressure higher than its critical pressure. (In this document the term "Rankine cycle" may refer to power cycles that do not involve phase change of the working fluid.) Heat available at relatively low temperatures compared to steam (inorganic) power cycles can be used to generate mechanical power through Rankine cycles using working fluids comprising HFO-153-10mzzy. In the method of this invention, working fluid comprising HFO-153-10mzzy is compressed prior to being heated. Compression may be provided by a pump which pumps liquid working fluid to a heat transfer unit (e.g., a heat exchanger or an evaporator) where heat from the heat source is used to heat the working fluid. The heated working fluid is then expanded, lowering its pressure. Mechanical energy is generated during the working fluid expansion using an expander. Examples of expanders include turbo or dynamic expanders, such as turbines, and positive displacement expanders, such as screw expanders, scroll expanders, and piston expanders. Examples of expanders also include rotary vane expanders (Musthafah b. Mohd. Tahir, Noboru Yamada, and Tetsuya Hoshino, International Journal of Civil and Environmental Engineering 2:1 2010).

Mechanical power can be used directly (e.g. to drive a compressor) or be converted to electrical power through the use of electrical power generators. In a power cycle where the working fluid is re-used, the expanded working fluid is cooled. Cooling may be accomplished in a working fluid cooling unit (e.g. a heat exchanger or a condenser). The cooled working fluid can then be used for repeated cycles (i.e., compression, heating, expansion, etc.). The same pump used for compression may be used for transferring the working fluid from the cooling stage.

Of note are methods for converting heat from a heat source to mechanical energy wherein the working fluid comprises of HFO-153-10mzzy. Also of note are methods for converting heat from a heat source to mechanical energy wherein the working fluid consists essentially of HFO-153-10mzzy. Also of note are methods for converting heat from a heat source to mechanical energy wherein the working fluid consists of HFO-153-10mzzy. HFO-153-10mzzy meets the need for a power cycle working fluid with a reduced GWP. In another embodiment, non-flammable compositions are desirable for use in power cycles. Of note are non-flammable compositions comprising HFO-153-10mzzy.

Additionally, in another embodiment, power cycles operated with HFO-153-10mzzy will have vapor pressures below the threshold necessitating compliance with provisions of the ASME Boiler and Pressure Vessel Code. Such compositions are desirable for use in power cycles.

Further, in another embodiment, low GWP compositions are desirable. Of note are compositions comprising at least 1-100 weight of HFO-153-10mzzy, which have GWP lower than 1500, preferably lower than 1000, more preferably lower than 750, more preferably lower than 500, more preferably lower than 150 and even more preferably lower than 10.

In one embodiment, the present invention relates to a method for converting heat from a heat source to mechanical energy using a sub-critical cycle. This method comprises the following steps: (a) compressing a liquid working fluid to a pressure below its critical pressure; (b) heating the compressed liquid working fluid from (a) using heat supplied by the heat source to form a vapor working fluid; (c) expanding the vapor working fluid from (b) to lower the pressure of the working fluid and generate mechanical energy; (d) cooling the expanded working fluid from (c) to form a cooled liquid working fluid; and (e) cycling the cooled liquid working fluid from (d) to (a) for compression.

Embodiments including use of one or more internal heat exchangers (e.g., a recuperator), and/or use of more than one cycle in a cascade system are intended to fall within the scope of the sub-critical ORC power cycles of the present invention.

In one embodiment, the present invention relates to a method for converting heat from a heat source to mechanical energy using a trans-critical cycle. This method comprises the following steps: (a) compressing a liquid working fluid above said working fluid's critical pressure; (b) heating the compressed working fluid from (a) using heat supplied by the heat source; (c) expanding the heated working fluid from (b) to lower the pressure of the working fluid below its critical pressure and generate mechanical energy; (d) cooling the expanded working fluid from (c) to form a cooled liquid working fluid; and (e) cycling the cooled liquid working fluid from (d) to (a) for compression.

In the first step of the trans-critical power cycle system, described above, the working fluid in liquid phase comprising HFO-153-10mzzy is compressed to above its critical pressure. In a second step, said working fluid is passed through a heat exchanger to be heated to a higher temperature before the fluid enters the expander wherein the heat exchanger is in thermal communication with said heat source. The heat exchanger receives heat energy from the heat source by any known means of thermal transfer. The ORC system working fluid circulates through the heat supply heat exchanger where the fluid gains heat.

In the next step, at least a portion of the heated working fluid is removed from the heat exchanger and is routed to the expander where the expansion process results in conversion of at least portion of the heat energy content of the working fluid into mechanical energy, such as shaft energy. The mechanical energy, e.g. shaft energy, can be used to do any mechanical work by employing conventional arrangements of belts, pulleys, gears, transmissions or similar devices depending on the desired speed and torque required. In one embodiment, the shaft can be connected to an electric power-generating device such as an induction generator. The electricity produced can be used locally or delivered to a regional grid. The pressure of the working fluid is reduced to below critical pressure of the working fluid, thereby producing vapor phase working fluid.

In the next step, the working fluid is passed from the expander to a condenser, wherein the vapor phase working fluid is condensed to produce liquid phase working fluid. The above steps form a loop system and can be repeated many times.

Embodiments including use of one or more internal heat exchangers (e.g., a recuperator), and/or use of more than one cycle in a cascade system are intended to fall within the scope of the trans-critical ORC power cycles of the present invention.

Additionally, for a trans-critical power cycle, there are several different modes of operation.

In one mode of operation, in the first step of a trans-critical power cycle, the working fluid is compressed above the critical pressure of the working fluid substantially isentropically. In the next step, the working fluid is heated under a substantially constant pressure (isobaric) condition to above its critical temperature. In the next step, the working fluid is expanded substantially isentropically at a temperature that maintains the working fluid in the vapor phase. At the end of the expansion the working fluid is a superheated vapor at a temperature below its critical temperature. In the last step of this cycle, the working fluid is cooled and condensed while heat is rejected to a cooling medium. During this step the working fluid condensed to a liquid. The working fluid could be subcooled at the end of this cooling step.

In another mode of operation of a trans-critical ORC power cycle, in the first step, the working fluid is compressed above the critical pressure of the working fluid, substantially isentropically. In the next step the working fluid is then heated under a substantially constant pressure condition to above its critical temperature, but only to such an extent that in the next step, when the working fluid is expanded substantially isentropically, and its temperature is reduced, the working fluid is sufficiently close to being a saturated vapor that partial condensation or misting of the working fluid may occur. At the end of this step, however, the working fluid is still a slightly superheated vapor. In the last step, the working fluid is cooled and condensed while heat is rejected to a cooling medium. During this step the working fluid condensed to a liquid. The working fluid could be subcooled at the end of this cooling/condensing step.

In another mode of operation of a trans-critical ORC power cycle, in the first step, the working fluid is compressed above the critical pressure of the working fluid, substantially isentropically. In the next step, the working fluid is heated under a substantially constant pressure condition to a temperature either below or only slightly above its critical temperature. At this stage, the working fluid temperature is such that when the working fluid is expanded substantially isentropically in the next step, the working fluid is partially condensed. In the last step, the working fluid is cooled and fully condensed and heat is rejected to a cooling medium. The working fluid may be subcooled at the end of this step.

While the above embodiments for a trans-critical ORC cycle show substantially isentropic expansions and compressions, and substantially isobaric heating or cooling, other cycles wherein such isentropic or isobaric conditions are not maintained but the cycle is nevertheless accomplished, is within the scope of the present invention.

In one embodiment, the present invention relates to a method for converting heat from a heat source to mechanical energy using a super-critical cycle. This method comprises the following steps: (a) compressing a working fluid from a pressure above its critical pressure to a higher pressure; (b) heating the compressed working fluid from (a) using heat supplied by the heat source; (c) expanding the heated working fluid from (b) to lower the pressure of the working fluid to a pressure above its critical pressure and generate mechanical energy; (d) cooling the expanded working fluid from (c) to form a cooled working fluid above its critical pressure; and (e) cycling the cooled liquid working fluid from (d) to (a) for compression.

Embodiments including use of one or more internal heat exchangers (e.g., a recuperator), and/or use of more than one cycle in a cascade system are intended to fall within the scope of the super-critical ORC power cycles of the present invention.

Typically, in the case of sub-critical Rankine cycle operation, most heat supplied to the working fluid is supplied during evaporation of the working fluid. As a result, when the working fluid consists of a single fluid component or when the working fluid is a near-azeotropic multicomponent fluid blend, the working fluid temperature is essentially constant during transfer of heat from the heat source to the working fluid. In contrast, working fluid temperature can vary when the fluid is heated isobarically without phase change at a pressure above its critical pressure. Accordingly, when the heat source temperature varies, use of a fluid above its critical pressure to extract heat from a heat source allows better matching between the heat source temperature and the working fluid temperature compared to the case of sub-critical heat extraction. As a result, efficiency of the heat exchange process between a temperature-varying heat source and a single component or near-azeotropic working fluid in a super-critical cycle or a trans-critical cycle is often higher than that of a sub-critical cycle (see Chen, et al., Energy, 36, (2011) 549-555 and references therein).

The critical temperature and pressure of HFO-153-10mzzy are 170.24° C. and 2.04 MPa (296.2 psia), respectively. The boiling point of HFO-153-10mzzy is 49° C. Use of HFO-153-10mzzy as a working fluid can enable power cycles that receive heat from heat sources with temperatures higher than the critical temperature thereof in a super-critical cycle or a trans-critical cycle. Higher temperature heat sources lead to higher cycle energy efficiencies and volumetric capacities for power generation (relative to lower temperature heat sources). When heat is received using a working fluid above its critical temperature, a fluid heater having a specified pressure and exit temperature (essentially equal to the expander inlet temperature) is used instead of the evaporator (or boiler) used in the conventional sub-critical Rankine cycle.

In one embodiment of the above methods, the efficiency of converting heat to mechanical energy (cycle efficiency) is at least about 4%. In a suitable embodiment, the efficiency (efficiency numbers) can be selected from the following: about 4 to 45%. In another embodiment, the efficiency is selected from a range that has endpoints (inclusive) of any two efficiency numbers supra.

Typically for sub-critical cycles, the temperature to which the working fluid is heated using heat from the heat source is in the range of from about 50° C. to about 165° C., preferably from about 80° C. to about 165° C., more preferably from about 125° C. to 165° C. Typically for trans-critical and super-critical cycles, the temperature to which the working fluid is heated using heat from the heat source is in the range of from about 171° C. to about 400° C., preferably from about 175° C. to about 300° C., more preferably from about 185° C. to 250° C.

In a suitable embodiment, the temperature of operation at the expander inlet can be any one of the following temperatures or within the range (inclusive) defined by any two numbers from: about 50-400° C. or preferably from 80-250° C.

The pressure of the working fluid in the expander is reduced from the expander inlet pressure to the expander outlet pressure. Typical expander inlet pressures for super-critical cycles are within the range of from about 3 MPa to about 15 MPa, preferably from about 5 MPa to about 10 MPa, and more preferably from about 5 MPa to about 8 MPa. Typical expander outlet pressures for super-critical cycles are within about 0.1 MPa above the critical pressure.

Typical expander inlet pressures for trans-critical cycles are within the range of from about the critical pressure to about 15 MPa, preferably from about the critical pressure to about 10 MPa, and more preferably from about the critical pressure to about 5 MPa. Typical expander outlet pressures for trans-critical cycles are within the range of from about 0.01 MPa to about 1.75 MPa, more typically from about 0.05 MPa to about 1.4 MPa, more typically from about 0.05 MPa to about 0.5 MPa.

Typical expander inlet pressures for sub-critical cycles are within the range of from about 0.1 MPa to about 0.2 MPa below the critical pressure, preferably from about 0.1 MPa to about 0.5 MPa below the critical pressure. Typical expander outlet pressures for sub-critical cycles are within the range of from about 0.01 MPa to about 1.75 MPa, more typically from about 0.05 MPa to about 1.4 MPa, more typically from about 0.05 MPa to about 0.5 MPa.

The cost of a power cycle apparatus can increase when design for higher pressure is required. Accordingly, there is generally at least a first cost advantage to limiting maximum cycle operating pressure. Of note are cycles where maximum operating pressure (typically present in the working fluid heater or evaporator and the expander inlet) does not exceed 4 MPa or preferably 2.0 MPa.

The novel working fluids of the present invention may be used in ORC systems to generate mechanical energy from heat extracted or received from relatively low temperature heat sources such as low pressure steam, industrial waste heat, solar energy, geothermal hot water, low-pressure geothermal steam (primary or secondary arrangements), or distributed power generation equipment utilizing fuel cells or prime movers such as turbines, microturbines, or internal combustion engines. One source of low-pressure steam could be the process known as a binary geothermal Rankine cycle. Large quantities of low-pressure steam can be found in numerous locations, such as in fossil fuel powered electrical generating power plants.

Other sources of heat include waste heat recovered from gases exhausted from mobile internal combustion engines (e.g. truck or rail or marine diesel engines), waste heat from exhaust gases from stationary internal combustion engines (e.g. stationary diesel engine power generators), waste heat from fuel cells, heat available at combined heating, cooling and power or district heating and cooling plants, waste heat from biomass fueled engines, heat from natural gas or methane gas burners or methane-fired boilers or methane fuel cells (e.g. at distributed power generation facilities) operated with methane from various sources including biogas, landfill gas and coal-bed methane, heat from combustion of bark and lignin at paper/pulp mills, heat from incinerators, heat from low pressure steam at conventional steam power plants (to drive "bottoming" Rankine cycles), and geothermal heat.

In one embodiment of the Rankine cycles of this invention, geothermal heat is supplied to the working fluid circulating above ground (e.g. binary cycle geothermal power plants). In another embodiment of the Rankine cycles of this invention, a novel working fluid composition of this invention is used both as the Rankine cycle working fluid and as a geothermal heat carrier circulating underground in deep wells with the flow largely or exclusively driven by temperature-induced fluid density variations, known as "the thermosyphon effect" (e.g. see Davis, A. P. and E. E. Michaelides: "Geothermal power production from abandoned oil wells", Energy, 34 (2009) 866-872; Matthews, H. B. U.S. Pat. No. 4,142,108-Feb. 27, 1979)

Other sources of heat include solar heat from solar panel arrays including parabolic solar panel arrays, solar heat from concentrated solar power plants, heat removed from photovoltaic (PV) solar systems to cool the PV system to maintain a high PV system efficiency.

In other embodiments, the present invention also uses other types of ORC systems, for example, small scale (e.g. 1-500 kW, preferably 5-250 kW) Rankine cycle systems using micro-turbines or small size positive displacement expanders (e.g. Tahir, Yamada and Hoshino: "Efficiency of compact organic Rankine cycle system with rotary-vane-type expander for low-temperature waste heat recovery", Intl J. of Civil and Environ. Eng 2:1 2010), combined, multistage, and cascade Rankine Cycles, and Rankine Cycle systems with recuperators to recover heat from the vapor exiting the expander.

Other sources of heat include at least one operation associated with at least one industry selected from the group consisting of: marine shipping, oil refineries, petrochemical plants, oil and gas pipelines, chemical industry, commercial buildings, hotels, shopping malls, supermarkets, bakeries, food processing industries, restaurants, paint curing ovens, furniture making, plastics molders, cement kilns, lumber kilns, calcining operations, steel industry, glass industry, foundries, smelting, air-conditioning, refrigeration, and central heating.

In another embodiment, a method for raising the maximum feasible evaporating temperature of an existing Rankine cycle system containing a first working fluid is provided. The method comprises replacing the first working fluid with a second working fluid comprising HFO-153-10mzzy.

HFO-153-10mzzy has lower evaporating pressures (at a given evaporating temperature) and higher critical temperatures than other higher pressure incumbent working fluids (i.e. fluids with lower normal boiling points such as HFC-245fa). Therefore, HFO-153-10mzzy could enable an existing ORC system to extract h eat at higher evaporating temperatures and realize higher energy efficiencies relative to HFC-245fa and other higher pressure fluids without exceeding the maximum permissible working pressure of the equipment.

The critical temperature of HFO-153-10mzzy is 170.2° C. With suitably designed equipment, it is possible to achieve an evaporator operating temperature at or just below the critical temperature.

Power Cycle Apparatus

In accordance with this invention, a power cycle apparatus for converting heat to mechanical energy is provided. The apparatus contains a working fluid comprising HFO-153-10mzzy. Typically, the apparatus of this invention includes a heat exchange unit where the working fluid can be heated and an expander where mechanical energy can be generated by expanding the heated working fluid by lowering its pressure. Expanders include turbo or dynamic expanders, such as turbines, and positive displacement expanders, such as screw expanders, scroll expanders, piston expanders and rotary vane expanders. Mechanical power can be used directly (e.g. to drive a compressor) or be converted to electrical power through the use of electrical power generators. Typically the apparatus also includes a working fluid cooling unit (e.g., condenser or heat exchanger) for cooling the expanded working fluid and a compressor (e.g a liquid pump) for compressing the cooled working fluid.

In one embodiment, the power cycle apparatus comprises a heat exchange unit, an expander, a working fluid cooling unit and a compressor, all of which are in fluid communication in the order listed and through which a working fluid flows from one component to the next in a repeating cycle.

In one embodiment, the power cycle apparatus comprises: (a) a heat exchange unit wherein a working fluid may be heated; (b) an expander in fluid communication with the heat exchange unit, wherein mechanical energy can be generated by expanding the heated working fluid by lowering its pressure; (c) a working fluid cooling unit in fluid communication with the expander for cooling the expanded working fluid; and (d) a compressor in fluid communication with the working fluid cooling unit for compressing the cooled working fluid, the compressor further being in fluid communication with the heat exchange unit such that the working fluid then repeats flow through components (a), (b), (c) and (d) in a repeating cycle. Thus, the power cycle apparatus comprises (a) a heat exchange unit; (b) an expander in fluid communication with the heat exchange unit; (c) a working fluid cooling unit in fluid communication with the expander; and (d) a compressor in fluid communication with the working fluid cooling unit, the compressor further being in fluid communication with the heat exchange unit such that the working fluid then repeats flow through components (a), (b), (c) and (d) in a repeating cycle.

FIG. 1 shows a schematic of one embodiment of the ORC system for using heat from a heat source. Heat supply heat exchanger 40 transfers heat supplied from heat source 46 to the working fluid entering heat supply heat exchanger 40 in liquid phase. Heat supply heat exchanger 40 is in thermal communication with the source of heat (the communication may be by direct contact or another means). In other words, heat supply heat exchanger 40 receives heat energy from heat source 46 by any known means of thermal transfer. The ORC system working fluid circulates through heat supply heat exchanger 40 where it gains heat. At least a portion of the liquid working fluid converts to vapor in heat supply heat exchanger (an evaporator, in some cases) 40.

The working fluid now in vapor form is routed to expander 32 where the expansion process results in conversion of at least a portion of the heat energy supplied from the heat source into mechanical shaft power. The shaft power can be used to do any mechanical work by employing conventional arrangements of belts, pulleys, gears, transmissions or similar devices depending on the desired speed and torque required. In one embodiment, the shaft can also be connected to electric power-generating device 30 such as an induction generator. The electricity produced can be used locally or delivered to a grid.

The working fluid still in vapor form that exits expander 32 continues to condenser 34 where adequate heat rejection causes the fluid to condense to liquid.

It is also desirable to have liquid surge tank 36 located between condenser 34 and pump 38 to ensure there is always an adequate supply of working fluid in liquid form to the pump suction. The working fluid in liquid form flows to pump 38 that elevates the pressure of the fluid so that it can be introduced back into heat supply heat exchanger 40 thus completing the Rankine cycle loop.

Figure 2:
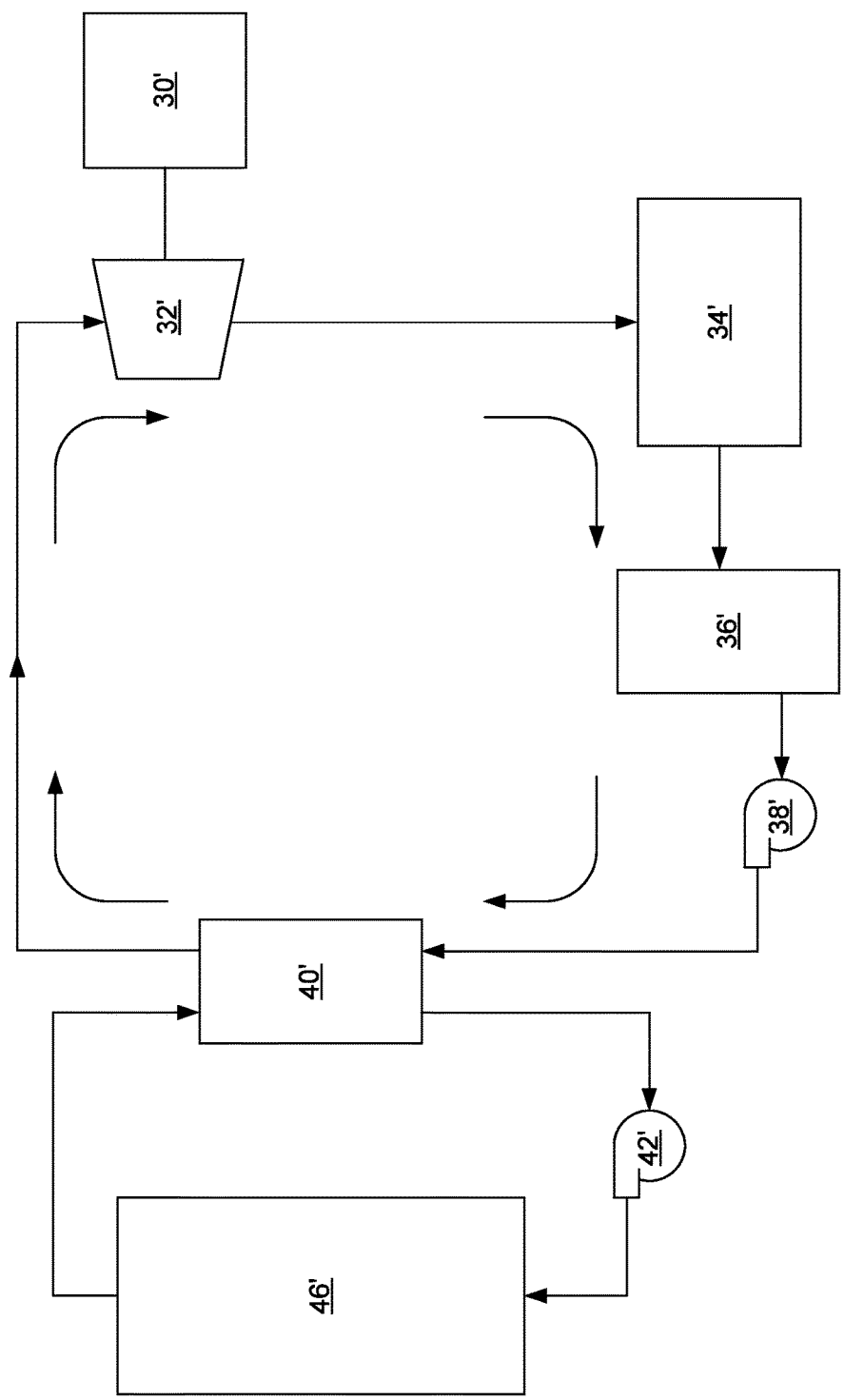
FIG. 2 is a block diagram of a heat source and a power cycle system (e.g. an organic Rankine cycle system) which uses a secondary loop configuration to provide heat from a heat source to a heat exchanger for conversion to mechanical energy according to embodiments of the present invention.

In an alternative embodiment, a secondary heat exchange loop operating between the heat source and the ORC system can also be used. In FIG. 2, an organic Rankine cycle system is shown, in particular for a system using a secondary heat exchange loop. The main organic Rankine cycle operates as described above for FIG. 1. The secondary heat exchange loop is shown in FIG. 2 as follows: the heat from heat source 46' is transported to heat supply heat exchanger 40' using a heat transfer medium (i.e., secondary heat exchange loop fluid). The heat transfer medium flows from heat supply heat exchanger 40' to pump 42' that pumps the heat transfer medium back to heat source 46'. This arrangement offers another means of removing heat from the heat source and delivering it to the ORC system. This arrangement provides flexibility by facilitating the use of various fluids for sensible heat transfer.

In fact, the working fluids of this invention can be used as secondary heat exchange loop fluids provided the pressure in the loop is maintained at or above the fluid saturation pressure at the temperature of the fluid in the loop. Alternatively, the working fluids of this invention can be used as secondary heat exchange loop fluids or heat carrier fluids to extract heat from heat sources in a mode of operation in which the working fluids are allowed to evaporate during the heat exchange process thereby generating large fluid density differences sufficient to sustain fluid flow (thermosyphon effect). Additionally, high-boiling point fluids such as glycols, brines, silicones, or other essentially non-volatile fluids may be used for sensible heat transfer in the secondary loop arrangement described. A secondary heat exchange loop can make servicing of either the heat source or the ORC system easier since the two systems can be more easily isolated or separated. This approach can simplify the heat exchanger design as compared to the case of having a heat exchanger with a high mass flow/low heat flux portion followed by a high heat flux/low mass flow portion. Organic compounds often have an upper temperature limit above which thermal decomposition will occur. The onset of thermal decomposition relates to the particular structure of the chemical and thus varies for different compounds. In order to access a high-temperature source using direct heat exchange with the working fluid, design considerations for heat flux and mass flow, as mentioned above, may be employed to facilitate heat exchange while maintaining the working fluid below its thermal decomposition onset temperature. Direct heat exchange in such a situation typically requires additional engineering and mechanical features which drive up cost. In such situations, a secondary loop design may facilitate access to the high-temperature heat source by managing temperatures while circumventing the concerns enumerated for the direct heat exchange case.

Other ORC system components for the secondary heat exchange loop embodiment are essentially the same as described for FIG. 1. Liquid pump 42 circulates the secondary fluid (e.g., heat transfer medium) through the secondary loop so that it enters the portion of the loop in heat source 46 where it gains heat. The fluid then passes to heat exchanger 40 where the secondary fluid gives up heat to the ORC working fluid.

In one embodiment of the above process, the evaporator temperature (temperature at which heat is extracted by the working fluid) is less than the critical temperature of the working fluid. Included are embodiments wherein the temperature of operation is any one of the following temperatures or within the range (inclusive) defined by any two numbers below: about 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169 and about 170° C.

In one embodiment of the above process, the evaporator operating pressure is less than about 2 MPa. Included are embodiments wherein the evaporating pressure of operation is any one of the following pressures or within the range (inclusive) defined by any two numbers below: about 0.1, 0.15, 0.2, 0.25, 0.3, 0.35, 0.4, 0.45, 0.5, 0.55, 0.6, 0.65, 0.7, 0.75, 0.8, 0.85, 0.9, 0.95, 1.00, 1.05, 1.10, 1.15, 1.20, 1.25, 1.30, 1.35, 1.40, 1.45, 1.50, 1.55, 1.60, 1.65, 1.70, 1.75, 1.80, 1.85, 1.90, 1.95, and about 2 MPa.

Use of low cost equipment components substantially expands the practical viability of organic Rankine cycles (see Joost J. Brasz, Bruce P. Biederman and Gwen Holdmann: "Power Production from a Moderate-Temperature Geothermal Resource", GRC Annual Meeting, Sep. 25-28, 2005; Reno, Nev., USA). For example, limiting the maximum evaporating pressure to about 2.2 MPa would allow the use of low-cost equipment components of the type widely used in the HVAC industry.

In one embodiment, compositions useful in the power cycle apparatus may comprise from about 1 to 100 weight percent HFO-153-10mzzy. In another embodiment, useful compositions consist essentially of from about 1 to 100 weight percent HFO-153-10mzzy. And in another embodiment, useful compositions consist of from about 1 to 100 weight percent HFO-153-10mzzy.

The apparatus may include molecular sieves to aid in removal of moisture. Desiccants may comprise activated alumina, silica gel, or zeolite-based molecular sieves. In certain embodiments, the preferred molecular sieves have a pore size of approximately 3 Angstroms, 4 Angstroms, or 5 Angstroms. Representative molecular sieves include MOLSIV XH-7, XH-6, XH-9 and XH-11 (UOP LLC, Des Plaines, Ill.).

Power Cycle Compositions

Also of note are working fluids wherein the composition has a temperature above the critical temperature of the working fluid and the lubricant is suitable for use at that temperature.

The working fluids comprising HFO-153-10mzzy that also include a lubricant may contain a lubricant selected from the group consisting of polyalkylene glycols, polyol esters, polyvinylethers, mineral oils, alkylbenzenes, synthetic paraffins, synthetic naphthenes, and poly(alpha)olefins.

Useful lubricants include those suitable for use with power cycle apparatus. Among these lubricants are those conventionally used in vapor compression refrigeration apparatus utilizing chlorofluorocarbon refrigerants. In one embodiment, lubricants comprise those commonly known as "mineral oils" in the field of compression refrigeration lubrication. Mineral oils comprise paraffins (i.e., straight-chain and branched-carbon-chain, saturated hydrocarbons), naphthenes (i.e. cyclic paraffins) and aromatics (i.e. unsaturated, cyclic hydrocarbons containing one or more rings characterized by alternating double bonds). In one embodiment, lubricants comprise those commonly known as "synthetic oils" in the field of compression refrigeration lubrication. Synthetic oils comprise alkylaryls (i.e. linear and branched alkyl alkylbenzenes), synthetic paraffins and naphthenes, and poly(alphaolefins). Representative conventional lubricants are the commercially available BVM 100 N (paraffinic mineral oil sold by BVA Oils), naphthenic mineral oil commercially available from Crompton Co. under the trademarks Suniso® 3GS and Suniso® 5GS, naphthenic mineral oil commercially available from Pennzoil under the trademark Sontex® 372LT, naphthenic mineral oil commercially available from Calumet Lubricants under the trademark Calumet® RO-30, linear alkylbenzenes commercially available from Shrieve Chemicals under the trademarks Zerol® 75, Zerol® 150 and Zerol® 500, and HAB 22 (branched alkylbenzene sold by Nippon Oil).

Useful lubricants may also include those which have been designed for use with hydrofluorocarbon refrigerants and are miscible with working fluids of the present invention under power cycle operating conditions. Such lubricants include, but are not limited to, polyol esters (POEs) such as Castrol® 100 (Castrol, United Kingdom), polyalkylene glycols (PAGs) such as RL-488A from Dow (Dow Chemical, Midland, Mich.), polyvinyl ethers (PVEs), and polycarbonates (PCs).

Lubricants are selected by considering a given expander's requirements and the environment to which the lubricant will be exposed.

Of note are high temperature lubricants with stability at high temperatures. The highest temperature the power cycle will achieve will determine which lubricants are required.

Of particular note are poly alpha olefin (POA) lubricants with stability up to about 200° C. and polyol ester (POE) lubricants with stability at temperatures up to about 200 to 220° C. Also of particular note are perfluoropolyether lubricants that have stability at temperatures from about 220 to about 350° C. PFPE lubricants include those available from DuPont (Wilmington, Del.) under the trademark Krytox®, such as the XHT series with thermal stability up to about 300 to 350° C. Other PFPE lubricants include those sold under the trademark Demnum™ from Daikin Industries (Japan) with thermal stability up to about 280 to 330° C., and available from Ausimont (Milan, Italy), under the trademarks Fomblin® and Galden® such as that available under the trademark Fomblin®-Y Fomblin®-Z with thermal stability up to about 220 to 260° C.

In another embodiment, a working fluid is provided which comprises HFO-153-10mzzy. Of note are compositions wherein the total amount of other compounds is from greater than zero (e.g., 100 parts per million or more) to about 50 weight percent.

A composition is provided for use in a power cycle that converts heat to mechanical energy. The composition comprises a working fluid comprising HFO-153-10mzzy as described above. The composition may be at a temperature above its critical temperature when used to generate power through trans-critical or super-critical cycles as described above. The composition may also comprise at least one lubricant suitable for use at a temperature of at least about 100° C., preferably 150° C., more preferably 175° C. Of note are compositions comprising at least one lubricant suitable for use at a temperature within the range of from about 175° C. to about 400° C. The compositions of this invention may also include other components such as stabilizers, compatibilizers and tracers.

EXAMPLES

The concepts described herein will be further described in the following examples, which do not limit the scope of the invention described in the claims.

Example 1

Chemical Stability of HFO-153-10Mzzy at High Temperatures

The thermal stability of HFO-153-10mzzy was assessed through testing in sealed glass tubes according to the methodology of ANSI/ASHRAE Standard 97-2007. Samples of HFO-153-10mzzy were placed in glass tubes with immersed coupons of metals (Fe, Al, Cu, Stainless Steel 304) commonly used in the construction of heat pumps and other equipment. The tubes were sealed and heated in an oven at 175° C. for 32 days. The decomposition of HFO-153-10mzzy after aging for 32 days was quantified in terms of the measured fluoride ion concentration in parts per million (ppm). The concentration of fluoride ion resulting from the degradation of HFO-153-10mzzy was less than 100 ppm indicating good thermal stability. HFO-153-10mzzy, despite its unsaturated chemical nature, exhibited thermal stability similar to Novec® HFE-7100, as shown in Table 1 below

TABLE 1

| Metal/Catalyst | HFO-153-10mzzy | Novec ® HFE-7100 |
| --- | --- | --- |
| Fe | 4.3 | 1.0 |
| Al | 2.0 | 6.8 |
| Cu | 1.3 | 4.5 |
| Stainless Steel 304 | 5.1 | 6.1 |

High thermal stability, non-flammability, low GWP, high critical temperature and low vapor pressure make HFO-153-10mzzy attractive as a working fluid in power cycles.

Example 2

Power Generation from Heat at an Expander Inlet Temperature of 200° C. with HFO-153-10MZZY Compared to HFC-245Fa Table 2 compares the performance of Rankine power cycles operating with HFO-153-10mzzy and HFC-245fa as the working fluids for a case where the available heat could be used to maintain the expander inlet temperature at 200° C. It is further assumed that the available equipment limits the maximum permissible working pressure to 3 MPa. The condenser temperature is specified as 100° C., a value suitable for a Combined Heat and Power (CHP) co-generation operation where the condenser heat is supplied to a district heating network. Additional common operating conditions are listed in the caption of Table 2. HFO-153-10mzzy enables an ideal cycle energy efficiency 27% higher than with HFC-245fa, in addition to having a GWP substantially lower than HFC-245fa.

TABLE 2

Performance of Rankine power cycles operating with HFO-153-10mzzy and HFC-245fa as the working fluids: expander inlet temperature: 200° C.; expander inlet pressure: 3 MPa; condenser temperature: 100° C.; liquid sub-cooling: 5 K; expander efficiency: 0.75; liquid pump efficiency: 0.5.

|  |  | HFC-245fa [Subcritical cycle] | HFO-153-10mzzy [transcritical cycle] | HFO-153-10mzzy vs. HFC-245fa % |
| --- | --- | --- | --- | --- |
| Evaporator Temperature | C. | 143.5 |  |  |
| Expander Inlet Superheat | K | 56.5 |  |  |
| Expander Inlet Temperature | C. | 200 | 200 |  |
| Expander Inlet Pressure | MPa | 3.01 | 3.00 |  |
| Condenser Pressure | MPa | 1.26 | 0.46 |  |
| Pressure Ratio |  | 2.38 | 6.59 |  |
| Expander Outlet temperature | C. | 173.4 | 153.1 |  |
| Cycle Thermal Efficiency | % | 4.88 | 6.2 | 27.0 |

What is claimed is:

1. A method for converting heat from a heat source to mechanical energy, comprising: heating a working fluid consisting of (2E)-1,1,1,4,5,5,5-heptafluoro-4-(trifluoromethyl)pent-2-ene (HFO-153-10mzzy) using heat supplied from the heat source; and expanding the heated working fluid to lower the pressure of the working fluid and generate mechanical energy as the pressure of the working fluid is lowered.

2. The method of claim 1, wherein the working fluid is compressed prior to heating; and the expanded working fluid is cooled and compressed for repeated cycles.

3. The method of claim 2 wherein heat from a heat source is converted to mechanical energy using a sub-critical cycle comprising: (a) compressing a liquid working fluid to a pressure below its critical pressure; (b) heating the compressed liquid working fluid from (a) using heat supplied by the heat source to form vapor working fluid; (c) expanding the vapor working fluid from (b) to lower the pressure of the working fluid and generate mechanical energy; (d) cooling the expanded working fluid from (c) to form a cooled liquid working fluid; and (e) cycling the cooled liquid working fluid from (d) to (a) for compression.

4. The method of claim 2 wherein heat from a heat source is converted to mechanical energy using a trans-critical cycle comprising: (a) compressing a liquid working fluid above said working fluid's critical pressure; (b) heating the compressed working fluid from (a) using heat supplied by the heat source; (c) expanding the heated working fluid from (b) to lower the pressure of the working fluid below its critical pressure and generate mechanical energy; (d) cooling the expanded working fluid from (c) to form a cooled liquid working fluid; and (e) cycling the cooled liquid working fluid from (d) to (a) for compression.

5. The method of claim 2 wherein heat from a heat source is converted to mechanical energy using a super-critical cycle comprising: (a) compressing a working fluid from a pressure above its critical pressure to a higher pressure; (b) heating the compressed working fluid from (a) using heat supplied by the heat source; (c) expanding the heated working fluid from (b) to lower the pressure of the working fluid to a pressure above its critical pressure and generate mechanical energy; (d) cooling the expanded working fluid from (c) to form a cooled working fluid above its critical pressure; and (e) cycling the cooled liquid working fluid from (d) to (a) for compression.

6. The method of claim 1 wherein the heat source is selected from the group consisting of: low pressure steam, industrial waste heat, solar energy, geothermal hot water, low-pressure geothermal steam, low-pressure geothermal steam, and distributed power generation equipment utilizing fuel cells or prime movers.

7. The method of claim 1 wherein the maximum operating pressure for the repeated cycles does not exceed 4 MPa.

8. A power cycle apparatus containing a working fluid to convert heat to mechanical energy, characterized by: said apparatus containing a working fluid consisting of (2E)-1,1,1,4,5,5,5-heptafluoro-4-(trifluoromethyl)pent-2-ene (HFO-153-10mzzy).

9. The power cycle apparatus of claim 8 comprising (a) a heat exchange unit; (b) an expander in fluid communication with the heat exchange unit; (c) a working fluid cooling unit in fluid communication with the expander; and (d) a compressor in fluid communication with the working fluid cooling unit, the compressor further being in fluid communication with the heat exchange unit such that the working fluid then repeats flow through components (a), (b), (c) and (d) in a repeating cycle.

10. The power cycle apparatus of claim 8 wherein the working fluid converts heat to mechanical energy by using heat from a heat source.

11. The power cycle apparatus of claim 10 wherein the heat source is selected from the group consisting of: low pressure steam, industrial waste heat, solar energy, geothermal hot water, low-pressure geothermal steam, low-pressure geothermal steam, and distributed power generation equipment utilizing fuel cells or prime movers.

12. The power cycle apparatus of claim 8 wherein the maximum operating pressure for the power cycle apparatus does not exceed 4 MPa.

13. The power cycle apparatus of claim 8 wherein the power cycle is a sub-critical cycle and the temperature to which the working fluid is heated by the heat source is in the range of from about 50° C. to about 165° C.

14. The power cycle apparatus of claim 8 wherein the power cycle is a trans-critical cycle or a super-critical cycle and the temperature to which the working fluid is heated by the heat source is in the range of from about 171° C. to about 400° C.

15. The power cycle apparatus of claim 8, wherein the power cycle is a Rankine cycle.

16. A method for raising the maximum feasible evaporating temperature of an existing power cycle system containing a first working fluid comprising: replacing the first working fluid with a second working fluid consisting of (2E)-1,1,1,4,5,5,5-heptafluoro-4-(trifluoromethyl)pent-2-ene.

17. The method of claim 16, wherein the power cycle system is a Rankine cycle system.

* * * * *